United States Patent
Huse et al.

(10) Patent No.: US 8,632,015 B1
(45) Date of Patent: Jan. 21, 2014

(54) METHOD AND APPARATUS FOR DYNAMIC, ON-DEMAND CREATION OF FINANCIAL TRANSACTION CARDS HAVING NONUNIFORM DATA STORAGE FORMATS

(75) Inventors: Brian J. Huse, Santa Barbara, CA (US); Doron Friedman, Goleta, CA (US); Ajay Singhvi, New York, NY (US)

(73) Assignee: Arroweye Solutions, Inc., Chicago, IL (US)

( * ) Notice: Subject to any disclaimer, the term of this patent is extended or adjusted under 35 U.S.C. 154(b) by 0 days.

(21) Appl. No.: 13/453,497

(22) Filed: Apr. 23, 2012

Related U.S. Application Data

(63) Continuation of application No. 12/411,057, filed on Mar. 25, 2009, now Pat. No. 8,162,229.

(60) Provisional application No. 61/039,275, filed on Mar. 25, 2008.

(51) Int. Cl.
*G06K 19/06* (2006.01)

(52) U.S. Cl.
USPC .......................... 235/492; 235/380; 235/375

(58) Field of Classification Search
USPC ................. 235/492, 380, 451, 375, 487
See application file for complete search history.

(56) References Cited

U.S. PATENT DOCUMENTS

| | | | |
|---|---|---|---|
| 6,039,356 A | | 3/2000 | Warther et al. |
| 7,878,400 B2* | | 2/2011 | Harris ..................... 235/462.04 |
| 2004/0084536 A1* | | 5/2004 | Goade, Sr. .................... 235/488 |
| 2005/0289080 A1 | | 12/2005 | Rhiando |
| 2007/0017975 A1* | | 1/2007 | Lewis et al. ................... 235/380 |
| 2007/0075132 A1* | | 4/2007 | Kean ............................. 235/380 |
| 2007/0181695 A1* | | 8/2007 | Keshura ........................ 235/488 |
| 2007/0205134 A1* | | 9/2007 | Dwyre .......................... 206/575 |
| 2007/0272097 A1* | | 11/2007 | Priya et al. ...................... 101/32 |
| 2008/0121688 A1* | | 5/2008 | Harrop .......................... 235/375 |

OTHER PUBLICATIONS

Notice of Allowance dated Mar. 12, 2012 for U.S. Appl. No. 12/411,057, filed Mar. 25, 2009. Applicant: Brian J. Huse.
Final Office Action dated Nov. 10, 2011 for U.S. Appl. No. 12/411,057, filed Mar. 25, 2009. Applicant: Brian J. Huse.
Response dated Feb. 10, 2012 to Final Office Action dated Nov. 10, 2011 for U.S. Appl. No. 12/411,057, filed Mar. 25, 2009. Applicant: Brian J. Huse.
Non-final Office Action dated Mar. 15, 2011 for U.S. Appl. No. 12/411,057, filed Mar. 25, 2009. Applicant: Brian J. Huse.
Response dated Aug. 15, 2011 to Non-final Office Action dated Mar. 15, 2011 for U.S. Appl. No. 12/411,057, filed Mar. 25, 2009. Applicant: Brian J. Huse.

* cited by examiner

*Primary Examiner* — Edwyn Labaze
(74) *Attorney, Agent, or Firm* — Burns & Levinson LLP; Bruce D. Jobse, Esq.

(57) ABSTRACT

A system and technique for manufacturing multiple financial transaction cards substantially simultaneously even though their respective parameters, including the format of data in a readable/writable medium thereon, may vary from card to card. A surface of a card contains a writable/readable medium for storing variable data and a two-dimensional data matrix. The variable data may be recorded on the writable/readable medium and may include an identifier which uniquely identifies the gift card from all other gift cards in the production set. The data stored in the two dimensional matrix serves as a reference to a data record, which may include data identifying another item, such as a greeting card or other carrier mechanism this, with which the card may be matched.

2 Claims, 4 Drawing Sheets

METHOD AND APPARATUS FOR DYNAMIC, ON-DEMAND CREATION OF FINANCIAL TRANSACTION CARDS HAVING NONUNIFORM DATA STORAGE FORMATS

CROSS REFERENCE TO RELATED APPLICATIONS

This application is a continuation of U.S. patent application Ser. No. 12/411,057, filed on Mar. 25, 2009, to be issued as U.S. Pat. No. 8,162,229, which claims priority to U.S. Provisional Application Ser. No. 61/039,275 filed Mar. 25, 2008, the subject matters of which are incorporated herein by these references in their entirety.

FIELD OF THE INVENTION

This invention relates to an electronic commerce, in general, and, more specifically, a system for on-demand manufacturing of customizable gift cards.

BACKGROUND OF THE INVENTION

Printing of some documents, such as financial payment mechanisms such as credit cards, gift cards, debit cards, phone cards, etc. which are printed on a plastic substrate does not lend itself well to efficient customized printing in small quantities. In typical prior art processes, all orders and all cards were manufactured in a client batch process, where large quantities of identical cards were printed and any defective cards merely discarded. This solution is acceptable with high-volume quantities of non-custom products. However, with individual cards or documents that are personalized with user-defined customizations, each card that does not print successfully has to be reprinted. This process becomes even more complex when the card, for example a gift card, is to be matched with another product, for example a greeting card or other tangible gift. In this situation, not only must each failed production be replicated, but the sequence of the card within the process must often be accounted for, less the combining the other gift cards with a tangible gift or other item likewise be unsynchronized. In typical prior art processes, batches of generic gift cards are printed in an initial part of the process, and, at a later part of the process, any type of customized data is then thermally printed or embossed on the plastic substrate.

In additions, systems currently exist that allows the personalization of a plastic card one at a time, such as those made by DataCard. Unfortunately, in such a process the quality is unacceptable and the process inefficient, slow, and costly for commercial viability. The big challenge is how to associate one out of multiple cards in a production run with the correct vendor and parameter configuration, such as magnetic stripe format, given that the magnetic stripe laminate isn't even adhered to the card until later in the manufacturing process Further, using conventional techniques, gift cards have typically been manufactured using a batch process technique in which a plurality of cards having one or more similar parameters are all set up and manufactured in batches. For example, a plurality of gift cards for vendor A would require a manual set up of the card data, typically involving the uploading of a list of card identifiers, and the specific magnetic strip format which includes the number of tracks, the arrangement of tracks and the exact positioning of where the data within the tracks of the magnetic strip are to be positioned and a common graphic for one or both sides. The cards for vendor A may then be manufactured.

If the next batch of cards to be manufactured are for vendor B, which utilize a different magnetic strip format than vendor A and different graphics, the entire process must be repeated since the formatting and arrangement of data within the magnetic strips is different from that of vendor A.

Because of the inherent inefficiencies in such a batching process, manufacturers are reluctant to set up batch runs of less than a minimum threshold quantity or entertain a request for a specific card format, thereby discouraging any kind of on-demand or real time requesting of gift cards from one or more vendors.

Systems and techniques for on-demand generation of customized greetings cards shipped in association with gifts are disclosed in U.S. Pat. Nos. 6,965,912 and 7,359,554, both entitled Method and Apparatus for Distribution of Greeting Cards with Electronic Commerce Transaction, and both by Friedman et al. Systems and techniques for on-demand generation of customized gift cards in association with on-demand generation of customized gift cards are disclosed in PCT Patent Application No. PCT/US04/13569, entitled Method and Apparatus for Creation, Personalization and Fulfillment of Greeting Cards with Gift Cards with Enhanced Security, published as International Publication No. WO 2005/114440 A1, and U.S. Pat. No. 7,370,076, also entitled Method and Apparatus for Creation, Personalization and Fulfillment of Greeting Cards, by Friedman et al. Notwithstanding the teachings for the foregoing documents, a need still exists for a method and technique which enables gift cards to be manufactured on-demand in accordance with the specifications of different vendors without the need for reformatting of the magnetic strip data on the card.

Accordingly, a need exists for a method and technique which enables a plurality of gift cards to be manufactured substantially simultaneously even though their respective parameters, including magnetic strip formats, may vary from card to card.

A further need exists for a method by which financial payment cards may be printed more efficiently.

An even further need exists for a method by which certain types of documents, such as those printed on rich materials, including polyvinyl chloride, other new or recycled plastics, vegetable based materials, etc., can be printed with customizations and personalization defined by the users, but which also utilizes the maximum throughput capability of the manufacturing processes.

SUMMARY OF THE INVENTION

Using the process and system disclosed herein, every gift card in a manufacturing batch is 100% completely customizable, including the magnetic strip format according to any vendor's specifications. For example, a sheet may comprise multiple gift cards from different retailers or multiple personalized cards from the same retailer, or any combination thereof, all completely printed from scratch in a high-speed batch process, notwithstanding the dissimilarities between the gift cards, including the format of data on the magnetic strip.

As described in the specification, the process begins with printing both sides of the gift card substrate, including all customizations. Next the printed gift card substrate is laminated, including application of a magnetic strip material to the back thereof. An identifier in the form of a data matrix, barcode or human readable characters is printed on either the gift card substrate or the laminate and is read/scanned and used to access the data profile for that particular gift card, including any of a Unique Identifier, Bar Code Content Data, Magnetic Strip Format Identifier, Magnetic Strip Content Data, Graphic Content Data and Shipping type. The magnetic strip data is then written in accordance with the appropriate magnetic strip format onto the gift card substrate with a magnetic write head. Once the gift cards are manufactured, they can be combined with a greeting card or other tangible gift, sorted according to shipping type, as defined in their respective gift card data profile, or both.

A system and technique is disclosed for manufacturing a plurality of financial transaction cards substantially simultaneously even though their respective parameters, including the format of data in a readable/writable medium thereon, may vary from card to card. A surface of the financial transaction card contains terms and conditions and graphics, a writable/readable medium for storing variable data and a two-dimensional data matrix. The writable/readable medium may be implemented with a strip of magnetic material applied to the surface of the card, a smart chip carried on the card substrate, a two dimensional data matrix such as a barcode viewable from the surface of the card such or any combination thereof. The variable data may be recorded on the writable/readable medium and may include an identifier which uniquely identifies the gift card from all other gift cards in the production set. The data stored in the two dimensional barcode serves as a reference to a data record, which may include data identifying another item, such as a greeting card, with which the gift card may be matched. In one embodiment, the data represented on both the gift card and the greeting card may be of the same values to facilitate matching their between, although not necessarily the same format.

According to a first aspect, a method of manufacturing a sheet of multiple financial transaction cards, each financial transaction card having a plurality of parameters associated therewith, including a writable data format for data storable on the financial transaction card, the method comprising: A) manufacturing as part of the sheet a first card with a first set of parameter values; and B) manufacturing as part of the sheet a second card with a second set of parameter values, wherein the writable data format of the second card is different from the writable data format of the first card.

In one embodiment, the method further comprises: (C) manufacturing as part of the sheet a third card with a third set of parameter values, wherein the writable data format of the third card is different from the writable data format of the first card and the second card According to a second aspect, a method of manufacturing a sheet of multiple gift cards, each card having a plurality of parameters, the system comprises: (A) a mechanism for affixing a first readable data storage mechanism to a surface of the card substrate; (B) a mechanism for affixing a second readable/writable data storage mechanism to a surface of the card substrate; (C) a mechanism for reading the data stored in the first readable data storage mechanism; (D) a mechanism for determining from the data read from the first readable data mechanism a value for a data format identifier for the second readable/writable data storage mechanism on the surface of the substrate; and (E) a mechanism for recording data to the second readable/writable data storage mechanism in accordance with the identified format. In one embodiment, the second readable/writable data storage mechanism may comprise strip of magnetic material. In another embodiment, D) further comprises one or more of reading a file identifier from first readable data storage mechanism, retrieving the identified file, including a format identifier, from computer memory, and providing a format identifier to an encoding apparatus.

According to third aspect, a method of manufacturing a sheet of financial transaction cards, each card having a plurality of parameters comprises: (A) affixing a first readable data storage mechanism to a surface of the card; (B) affixing a second readable/writable data storage mechanism to a surface of the card; (C) reading the data stored in the first readable data mechanism; (D) determining from the data read from the first readable data mechanism a value for a data format identifier for the second readable/writable data storage mechanism on the surface of the substrate; and (E) recording data to the second readable/writable data storage mechanism in accordance with the identified format.

According to fourth aspect, gift card article of manufacture comprises A) a substrate having a plurality of surfaces; B) a readable/writable data storage mechanism affixed to a surface of the substrate; C) a data matrix viewable from a surface of the substrate, the two-dimensional data matrix representing data used to identify the data format and/or content data written to the readable/writable data storage mechanism. In one embodiment, the data matrix may comprise a two-dimensional barcode. In another embodiment, the readable/writable data storage mechanism may comprise strip of magnetic material or a smart semiconductor devices.

According to a fifth aspect, an article of manufacture comprises: A) an envelope having a two-dimensional data matrix affixed to a surface thereof; B) a carrier document having a two-dimensional data matrix affixed to a surface thereof and inserted into the envelope; C) a financial transaction card having a two-dimensional data matrix affixed to a surface thereof, the financial transaction card attached to a surface of the greeting card, wherein the two-dimensional data matrix on at least the gift card and the carrier document contains data used to identify a data structure at least partially defining a common parameter of both the gift card and carrier document. In one embodiment, the common parameter comprises a unique identifier shared by the gift card and carrier document. In one embodiment, the two-dimensional data matrix may comprise a standard barcode 128.

According to sixth aspect, an article of manufacture comprises: A) a substrate having a plurality of surfaces; B) a data storage mechanism affixed to a surface of the substrate; and C) a first data matrix viewable from the surface of the article, the data matrix representing data used to identify a format for the content data written to the data storage mechanism. In one embodiment, the data storage mechanism comprises a data matrix or a barcode.

BRIEF DESCRIPTION OF THE DRAWINGS

The above and further advantages of the invention may be better understood by referring to the following description in conjunction with the accompanying drawings in which:

FIG. 4 is a conceptual diagram of gift card data structure, a gift card, a greeting card and an envelope in the relationship there between.

DETAILED DESCRIPTION

Figure 1:
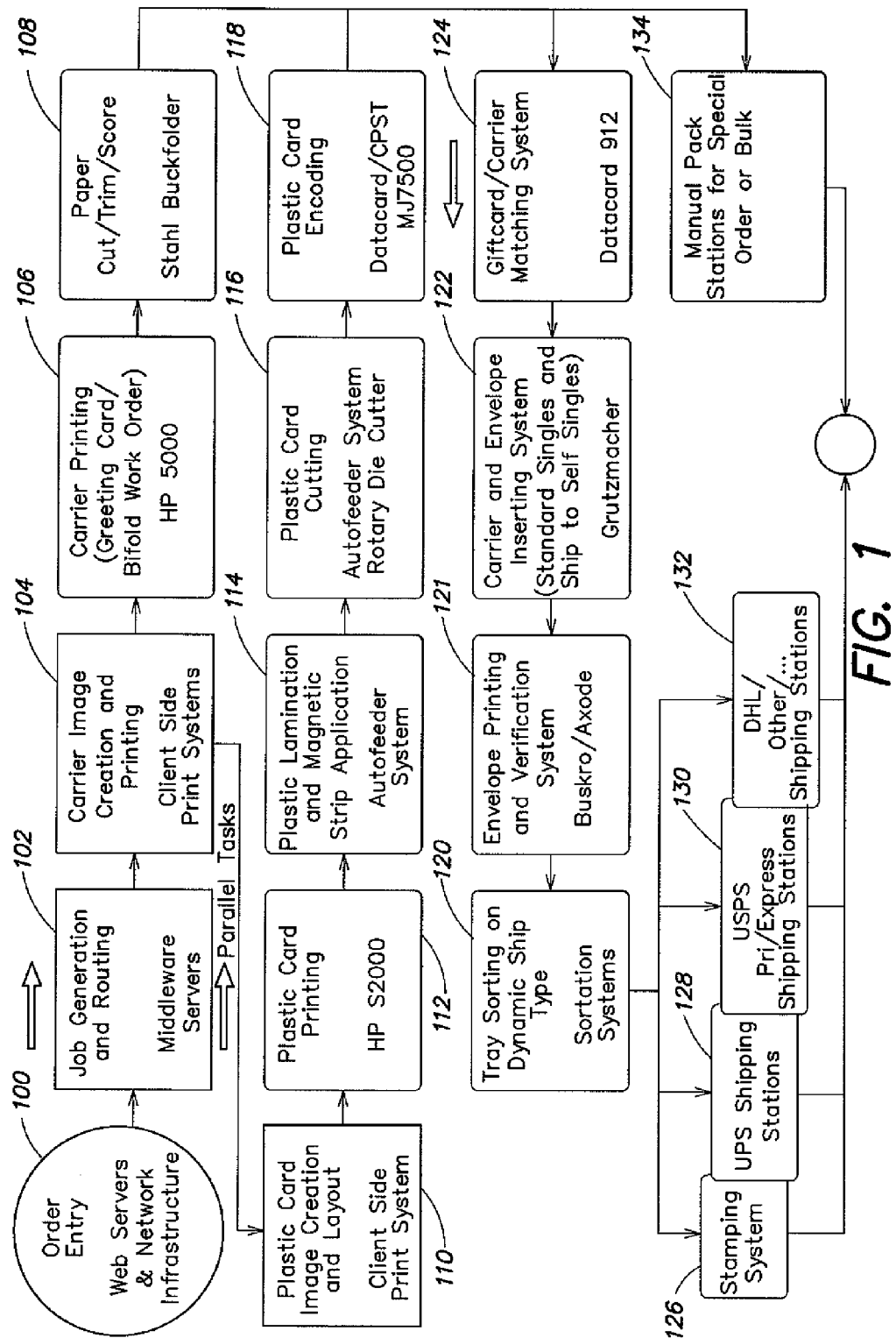
FIG. 1 is a conceptual block diagram of the manufacturing system and functional flow of the manufacturing system.

Disclosed is a web to print-on-demand infrastructure that supports a vertically integrated platform from order placement to printing retail quality one-off gift cards on digital presses. These cards can then be fulfilled individually, in bulk, or in personalized carriers, such as greeting cards or retailer/bank or retailer branded standard carriers.

The system enables clients, either retailers or banks, to work with one vendor rather than a host of vendors that provide partial functionality for lower costs. The disclosed system has a speed advantage since "just in time" manufacturing can happen under one roof without sacrificing quality and scalability. The disclosed system provides clients with web order software, personalization technology, on demand manufacturing of plastic payment cards, on demand printing of carriers and an array of fulfillment services including matching personalized and non personalized payment cards with personalized greeting cards and/or carriers.

In one embodiment, the platform may be built on a three layered architecture: a web front end, the message processing system, and distributed print and fulfillment locations. The web front end is used primarily for order taking and personalization of gift cards. The middle ware or message processing system functions as the command and control center that communicates with a distributed print infrastructure as well as with third parties, like clients, data processors (open and closed loop), EDI vendors, etc., not to mention managing the data from all sources. The distributed print and fulfillment locations are the centers that actually compose the layouts, print and manufacture the personalized products in addition to fulfilling and shipping the product.

Such system is scalable across multiple locations as well as within a given location by simply adding additional equipment. The system is built to load balance across multiple print devices as well as fulfillment equipment within a location.

In one embodiment, the system uses high quality digital presses to ensure consistent quality at high speeds even though each card is unique and can be from a different retailer. The system prints 21 plastic cards on a 12×18 sheet with the intelligence to dynamically modify number of gift cards printed depending on the custody of the digital press or printer, and to sequence all the gift cards within a job to account for post processing fulfillment equipment.

As used herein, the term "gift card" is not meant to be limiting and encompasses any financial transaction mechanisms including, but not limited to, credit cards, gift cards, debit cards, phone cards, stored value cards, non-stored value cards and their respective equivalents thereto.

The above described problems and objects are addressed with a process which utilizes a technique of printing large numbers of customized cards with less manufacturing steps so that all customized data is present underneath the laminated surface of the card and does not require additional printing steps. An illustrative process flow is described with reference to FIG. 1 with regard to the production model, the printing, surface preparation, lamination, data encoding, the matching, and envelop printing and sorting sub-processes that are part of the process. These processes in some processes are described with reference to component systems of FIG. 1 and process module blocks 100-134 of FIG. 1.

Referring to FIG. 1, the process/system for on-demand generation of customizable greeting cards is represented by items 100 through 108 portion of which which may have structure and function similar to items described in the previously referenced Friedman patents and patent applications, but with the addition of the additional system components and processes described herein. In the subject implementation, Order Entry and Web Servers & network infrastructure 100 comprise the computer and network equipment associated with interfacing and accepting orders online. These systems may be designed to operate concurrently from multiple locations, thus allowing for online redundancy. In one embodiment, there may be multiple points of order entry into the system including via the Internet, call centers, customize corporate order tools, and automated order generation facilities.

The Job Generation and routing Middleware Servers 102 may comprise middleware servers and high speed databases which communicate with the card processors, create the print jobs and route to the correct print locations based on client specific sorting requirements. The Carrier Printing system and typically comprise servers and databases, some of which may be located remotely at a client's fulfillment facility, and are used to store and process the greeting card images and deliver to the same to the appropriate print system, as requested. In the illustrated embodiment, as described herein, some of the components of system 104 may be duplicative of or utilized with printing on both greeting cards in system 104 and gift cards in system 110. The Carrier Printing (Greeting Card/Bifold or Work Order) system 106 may comprise one or more digital printing presses, such as the HP 5000 digital printing presses. Print speed from 2000-4000 cards per hour based on type, using blended average 3000 per hour based on estimated split of 4×4, 4×1 and 4×0 printing. Finally, the Carrier Paper Cut/Trim/Score equipment 108 may be implemented with a Stahl buckfolder B20, which may have throughput of up to 15,000 cards per hour.

Production Model

The described technique utilizes customized data on a production set model for printing quantities of on-demand, personalized documents on hard substrates up to the efficiency limits of the manufacturing process. The production set comprises a variable number of individual client batches up to a maximum number, for example 2000 units, that is limited only by the manufacturing capacity of the physical devices utilized in the manufacturing process. In the contemplated process, the production set comprises a plurality of sheets of carrier medium, such as polyvinyl chloride, upon which any number of gift cards from a variable number of clients may be manufactured, some gift cards of which may be of a standard design and others of which may include user-defined personalizations.

The gift cards within a production set are all printed as part of the same process. What results is individual sheets of printed gift cards, for example 21 gift cards per sheet, which also includes a control card identifying the client(s), a batch number, and shipping requirements for the gift cards within that particular sheet. Multiple sheets of substrate will typically be present within the production set run. Once the gift cards have been manufactured, they may be matched with greeting cards or other documents or tangible gifts, as explained hereinafter, and shipped according to the clients' shipping requests.

Figure 2:
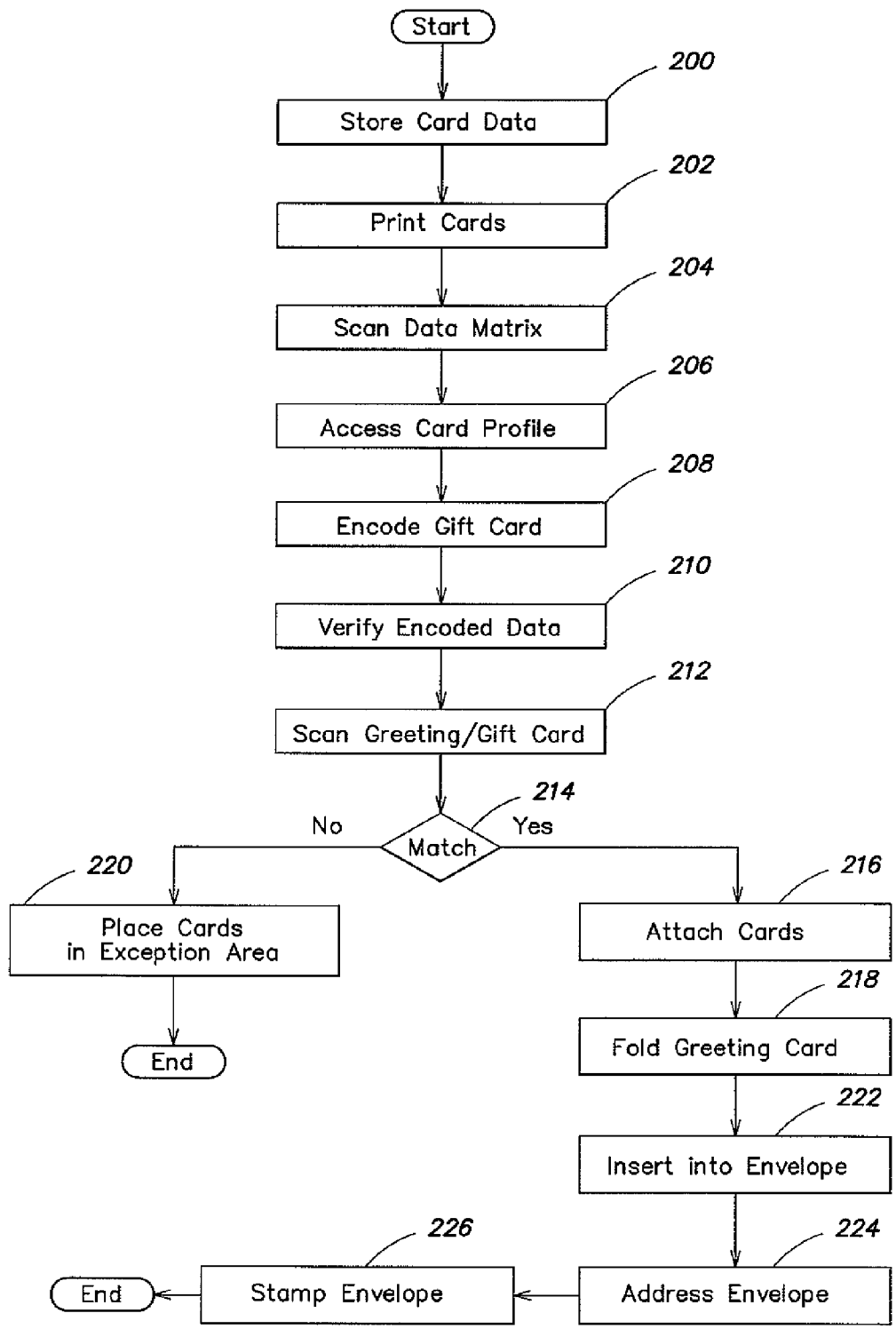
FIG. 2 is a flowchart of the disclosed manufacturing process.

The process by which personalized gift cards are generated in association with personalized greeting cards is described with reference to the flowchart of FIG. 2 as well as the diagram of FIG. 1. In accordance with the contemplated process, multiple steps are involved in the manufacturing of the gift cards.

Printing

As an initial step in the gift card manufacturing process, systems 110 are used to store and process the gift card images and deliver the same to the appropriate print system, upon request, as illustrated by process block 200. The Carrier & Plastic Image Creation and Printing systems 110 typically comprise servers and databases, some of which may be located remotely at a client's fulfillment facility. As noted previously, some of the components of system 110 may be duplicative of or utilized with creation of both greeting cards in system 104 as well as gift cards in system 110. The sheets of substrate are printed using system 112 with graphic images and text for the individual cards within each sheet, and, for all sheets within the production run or print set, as illustrated by process block 202. System 112 may comprise one or more printers for applying graphics to the carrier medium. A professional quality printer suitable for printing of the graphics on a substrate in accordance with the disclosed techniques, is the HP Indigo S2000, commercially available from Hewlett-Packard Corp., Palo Alto, Calif. Such printer is particularly well suited for printing on substrates having a thickness in excess of 12 mils. The HP S2000 digital industrial press is designed for printing of very heavy substrates such as 24 mil PVC. An estimated throughput in cards per hour may be from 7500/5 color clear plastic (5×5) cards, to as high as 15000 standard 4×1 typical plastic cards. In one embodiment, the control software is able to adjust for natural drift of the magnetic strip material on the laminate rolls. This adjustment may be achieved by measuring the distances between the magnetic strips (at 0.005") accuracy and entering these measurement into the control software prior to printing of the substrate to ensure accurate alignment.

Because the gift card typically utilize both sides of the substrate, a first side of the gift cards are printed resulting in a plural sheets of cards having only one side printed. These sheets are then turned over, and the second sides of the cards printed. Key markers on the sheets may be utilized to ensure proper back to front or front to back alignment during the printing process. Individual sheets may then be inspected to confirm proper alignment between the two sides of the cards, as printed. In the disclosed embodiment, the back surfaces of the cards on all sheets within the production set may be printed first and then the front surfaces of the cards on all sheets within the production set may be printed second. It will be obvious to those reasonably skilled in the arts that this process may be reversed with the front surfaces of all cards printed initially, followed by the printing of the back surfaces of all cards. In another alternative, albeit less efficient, embodiment the process may include printing of less than all cards or sheets within a production set. In yet another alternative embodiment, the printing system 112 may have duplex capabilities, i.e. printing both sides of the cards sequentially, or, perfecting capabilities, i.e. printing both sides of the cards simultaneously. The process of printing both sides of the substrate is also illustrated by process block 202 in FIG. 2.

In the illustrative embodiment, the two-dimensional barcode may be a conventional bar code in accordance with any of the known formats, such as PDF-417, QR code, and Data Matrix formats or may be similar to any of those described in U.S. Pat. Nos. 5,625,721; 5,703,972; 6,977,751; 6,398,332; 6,394,573; 7,198,194; 7,310,157. The PDF-417 format is a multi-layer two-dimensional code having variable symbol length and height developed by Symbol Technologies Co. and is described in U.S. Pat. No. 5,304,786. The QR code format is a two-dimensional code developed by Nippondenso Co. of Japan and is described in U.S. Pat. No. 5,726,435. The Data Matrix format is a matrix code developed for increasing of the amount of expressive data per symbol. A symbol size can be 0.001. to about 0.14 inches for one side. It could be a regular square by 1 inch for expressing 2334 alphanumeric characters or 500 numbers as expressed by a dot matrix printer and by 1.4 inch for all 500 ASCII. The data matrix has two kinds of symbols of ECC000-140 and ECC200 according to error checking and correction algorithms. ECC000-140 is a selected convolution error checking and correction algorism and ECC200 is a selected Reed-Solomon algorism.

In the illustrative embodiment, because of the reduced area of the gift card, the barcode may be of a particularly small dimensions, such as approximately less than ¼" square, and possibly even less than ⅛" square, depending on the data matrix format and the quantity of data to be stored thereby. In one embodiment, the barcode may be printed directly on any surface of the substrate of a gift card. Alternatively, the barcode may be printed separately from the substrate on a corresponding laminate sheet that includes a strip of magnetically readable material. Such sheet may then be affixed to the substrate using the process described herein. The process of printing the barcode on the substrate or any laminate sheet is also illustrated by process block 202 in FIG. 2. In one embodiment, the bar code or 2D data matrix is printed on the substrate using "invisible" ink that would then require that the card be viewed under conditions the make the ink visible, such as under an ultraviolet (UV) lamp for UV ink.

In another embodiment, the data matrix or barcode may be replaced with one or more human readable characters, such as an alphanumeric code, or symbols which may then be viewed by a camera operatively coupled to a processor executing an optical character recognition software package. The recognized code read off the back of the financial transaction card can be used for driving the encoding and/or matching processes as described herein.

The proprietary encoding process uses the randomly generated unique ID which may be internal to the system, to drive dynamic retrieval of magnetic strip data, which is preformatted by the software and inline encoded. The disclosed process tracks each plastic and personalized greeting card at every step of the manufacturing and fulfillment process via a unique ID.

Surface Preparation

Following printing of one or both surfaces of the carrier medium, the gift cards are electrostatically charged causing the substrate molecules on the surface of each card face to pop up or rise. The effect of this process is to create a higher friction surface upon which a laminate can then be more readily attached. Such electrostatic treatment may be performed with a corona discharge apparatus after printing for more desirable results. A corona discharge surface treating machine suitable for use in the disclosed process is commercially available from Corotec Corportion, Farmington, Conn. In the illustrative process the printing, surface preparation and lamination described herein typically occur within a 24 hour period. The process of preparing the surface of the substrate is also illustrated by process block 202 in FIG. 2.

Lamination Process

In accordance with the disclosed techniques, a surface of the gift card includes a writable/readable mechanism for storing variable data. The writable/readable mechanism may comprise a strip of magnetic material applied to the surface of the card. Following electrostatic surface preparation of the substrate, system 114 is utilized to secure one more sheets of a laminate material, for example a synthetic clear resin, to the carrier medium. In the illustrative embodiment, both top and bottom laminate sheets may be positioned and secured to the substrate simultaneously using the processes described herein. The sheet of laminate secured to the bottom or back of the substrate may include the strip of magnetically readable material. As a sheet of cards from the production set is drawn through the laminating facility, a sheet of laminate to which an adhesive material has been previously applied to a surface thereof is positioned over the first or top surface of the card substrate. Similarly, a sheet of laminate containing a magnetically readable strip and to which an adhesive material has also been previously applied is positioned over the second or bottom surface of the substrate so as to sandwich the carrier therebetween. In an alternative embodiment, a two dimensional data matrix or barcode may take the place of the magnetic strip on the gift card. In such embodiment, a barcode reader is used to extract the data from the barcode. As such the magnetic strip substrate may be eliminated.

Next, the substrate, in combination with the laminates, is passed through one or more heated rollers which melt, and, therefore activate, the adhesive on the surfaces of the laminate(s) adjacent the card medium. In addition, the heated rollers heat the laminate(s) and the substrate while applying positive pressure thereto, causing the combination of such elements to be simultaneously heated and pressed together to form a single sealed card entity. The cards are then cooled using fans or water cooled rollers so that the cards remain permanently sealed. A machine suitable for use with system 114 in the lamination and sealing process in accordance with this disclosure is the Cimrex12 commercially available from Autofeeds Inc., Suamica, Wis. 54173 which is a dual roller system for sheet feeding printed PVC, for example in the range from 0.10 mil to 0.24 mil, and applying a front clear coat laminate, and a back clear laminate including a magnetic strip with automatic registration for ISO compliance.

The above process is performed optimally with each sheet of substrate within the production set. Following cooling, system 116 is utilized to cut the individual cards from the sheet of which they have been formed and stack the cards. The disclosed system may use a roll lamination process which feeds straight into a die cutter that cuts the 21 cards out of the sheet. This process enables a plastic card to go from the printing press straight into the laminator and out of the die cutter within seconds at speeds of up to 30,000 cards per hour, so one lamination system can support multiple print systems. As manufactured, the gift cards may have thickness of approximately 25 to 35 mils. A machine suitable for use in the die cutting process in accordance with this disclosure is the PunchCardPro, commercially available from M.G.I., USA, Melbourne, Fla. 32935. Such a rotary die cutting system 116, can cut 21 cards per rotation from an 18×12 sheet, with a production speed of approximately 7,000 cards per hour. System 116 may also be equipped with a "programmable" output stacker, that enables trigger stacking of cards based on information on printed on gift cards, thus allowing separate stacks of cards by batch, with the batches have variable number of cards per batch. The process of laminating the one or both sides of the substrate is also illustrated by process block 202 in FIG. 2.

Encoding of Cards

The disclosed system also uses a unique plastic encoding process that facilitates simultaneous dynamic creation of the magnetic strip data on the gift card, with variable formats for different retailers or banks. The data sent to the encoders is indifferent with respect to what is being encoded, e.g., based on shipping requirements different retailer gift cards can be intermixed (card to card) during the encoding process, even if the gift cards have different magnetic strip formats and processors. The encoding is triggered by a random unique ID printed on the back of the plastic gift card Once the gift card has been manufactured, the gift cards are encoded utilizing system 118. In the illustrative embodiment, the two-dimensional data matrix or barcode, which serves a random unique ID, has been applied to the substrate and is read with an optical scanning device, as illustrated by process block 204. The data read from the barcode is then used to access a gift card profile associated with a particular card that had been previously defined and stored within a computer memory, as illustrated by process block 206. The gift card profile may comprise any of the following information:

Unique Identifier
Bar Code Content Data
Magnetic Strip Format Identifier
Magnetic Strip Content Data
Graphic Content Data
Shipping type In this manner, the magnetic strip format identifier and content data stored in the gift card profile maybe readily accessed for writing to that specific card. The magnetic strip data is then written in accordance with the appropriate magnetic strip format onto the gift card substrate with a magnetic write head, as illustrated by process block 208. This process enables the intermix of retailers on a card by card basis, while ensuring that the magnetic strip data is flexible enough to meet the requirements of different retailers and different banks. Any of the items within the gift card profile above may be written or encoded onto the magnetic strip. One or all of the items. The data encoded onto the magnetic strip of the substrate is then read back with a magnetic read head for verification purposes to ensure that the data has been written properly, as illustrated by process block 210.

If the data read from the magnetic strip of the gift card does not corroborate the data contained within the gift card profile, an error will be signaled and the gift card may be placed into an exception queue or destroyed, as also illustrated by process block 210. Otherwise, if the data read from the magnetic strip is verified appropriately, the gift card is essentially completed and ready for matching, as described hereafter.

An apparatus suitable for use with system 118 to perform the writing and reading/verification of the magnetic strip data processes as described herein, is the CPST MJ7500 available from Datacard/GaVerhren of St Louis Mo. A feeder apparatus useful with the writing/reading/verification system is the MFT250ip Serial Friction Feeder, commercially available from Multi-Feeder Technology, a St. Paul, Minn. 55110, the structure and various functional aspects of which are described in one or more of the following U.S. Pat. Nos. 6,050,563, 6,086,061, 6,206,368, 6,394,443, 6,572,102, 6,607,193, 664,644. System 118 may be a high speed magnetic strip encoding system that reads the two dimensional barcode, and, based on this information encodes the magnetic strip. System 118 operates in real time with a list management interface, to enable dynamic remote loading of a list, as the plastic cards are being printed on the S2000.

In an alternative embodiment, in a "logging" mode, all of the data is read from both the greeting card and the gift card using their respective greeting/scanning apparatus and the information is uploaded in real time to the database associated with the system control software, enabling card activation to be done on an as requested basis. For example, a plurality of preprinted or promotional gift cards and greeting cards can be manufactured, with subsequent matching of a gift card with a specific customer profile and any associated greeting card on an as needed or requested basis.

Figure 3:
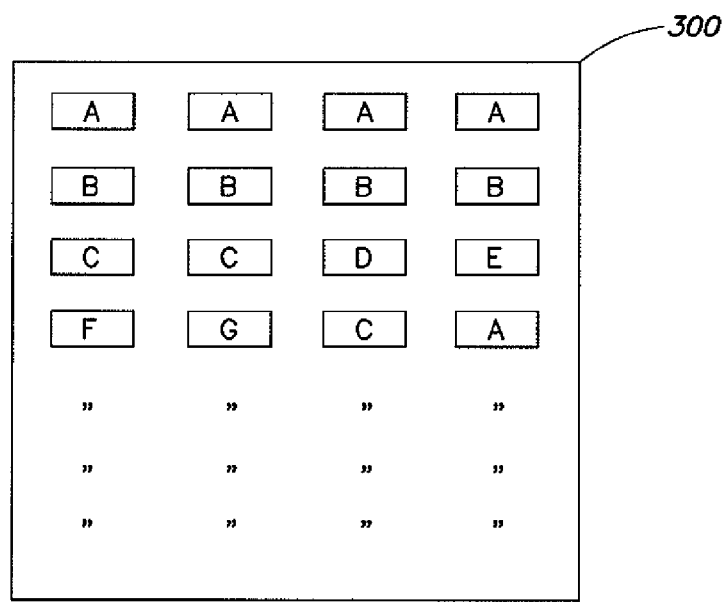
FIG. 3 is a conceptual diagram of a production model sheets of cards.

The above described process enables the rapid manufacture of gift cards with 100% variability of substantially all gift card parameters, including front and back graphics and a magnetic strip format and data type, without negatively affecting the speed with which the gift cards may be manufactured. FIG. 3 illustrates conceptually a sheet of gift cards in accordance with the disclosed production model and process in which less than all of the cards on the sheet have the same magnetic strip format. Specifically, a substrate sheet 300 includes a plurality of gift cards that have been manufactured in accordance with the technique disclosed herein. Those gift cards marked with an "A" represent gift cards manufactured according to the specification of a vendor A having a first magnetic strip data format. Those gift cards marked with an "B" represent gift cards manufactured according to the specification of a vendor B having a second magnetic strip data format. Those gift cards marked with an "C" represent gift cards manufactured according to the specification of a vendor C having a third magnetic strip data format. Those gift cards marked "D" through "G" represent gift cards manufactured according to the specification of vendor D-G respectively, which may have any of the first three magnetic strip data formats or other magnetic strip data formats, and are shown to illustrate the ability to have the production of a single card or multiple cards non-sequentially. Note also, that in the gift cards illustrated in FIG. 3, any of the other parameters associated with the gift card, as described herein may also vary, including the card identifier, card graphics, etc.

In the disclosed process, a software control module which may be part of the middleware servers in module 102 coordinates the various systems and apparatus in the manufacturing process, including the setting up of the card substrate sheet layout, the sending, in real-time across the network and on a per barcode-basis, of the bar code data to the encoding system, the retrieval of the magnetic strip information from the gift card profile and the writing and encoding of data to the magnetic strip write/read machine.

A random unique ID, similar to that described elsewhere herein, identifies a carrier mechanism, such as a greeting card or other material, for purposes of dynamic insertion of data into the addressing database for envelope creation and shipment tracking information, and is printed on one of the surfaces of the gift card.

Once the gift cards are manufactured, if they are not to be combined with a greeting card or other tangible gift, they can be sorted according to shipping type as defined in their respective gift card data profile. Alternatively, if the gift card is to be matched with a carrier document, such as a greeting card or other tangible product, using the matching process described herein. For illustrative purposes only, the gift cards manufactured accordance with the processes described herein will be matched with greeting cards as set forth below.

Matching Process

Following manufacturing, the gift cards are matched with greeting cards with systems 120-124. System 120 validates that the carrier and gift card go together, glues the card to the carrier, folds the carrier and hand it off to the inserter, as illustrated by process block 212 and decisional block 214 and process blocks 216 and 218. Specifically, the greeting cards, which have also been manufactured with a conventional barcode or other readable data mechanism on a surface thereof, are advanced along the production path where they are exposed to a hot glue sprayer which deposits glue onto a surface of each greeting card. Following exposure to the hot glue sprayer, a barcode scanner under control of system control software reads a barcode from each greeting card and stores the greeting card identification data with a database associated with the system control software, or, alternatively, in a working register or data structure. As the greeting card moves along its respective the production path, the gift card also advances along its respective production path and a magnetic strip reader reads the gift card identifier stored on track three of the magnetic strip of the gift card. In the contemplated embodiment, the data on track three of the gift card has the same data as represented by the barcode on its corresponding greeting card and vice versa. Once verification of a match between a gift card and a corresponding greeting card occurs, the gift card is attached to the greeting card, typically by placing the gift card on the glue deposited on a surface of the corresponding greeting card. The greeting card then is then folded, for example, bi-folded, and run through a press. The greeting cards are inverted, if necessary, so that the barcode faces downward. The cards are then placed into a hopper. In an alternative embodiment, a two dimensional data matrix or barcode may take the place of the magnetic strip on the gift card. In such embodiment, a barcode reader is used to extract the data from the barcode. As such the magnetic strip substrate may be eliminated.

If the identification data on a track of the gift card magnetic strip does not match the identification data read from the barcode on the greeting card, the production system may be stopped and the gift card and its counterpart greeting card are removed from the production path. Alternatively, both the mismatched gift card and greeting card may be routed to an exception queue for further analysis and/or reprinting of one or the other or both, as also illustrated by decision block 214 and process block 220.

An apparatus suitable for use as system 124 in matching and folding processes described herein, including any of the functions of the glue machine, barcode reader for reading the greeting card, magnetic strip reader for reading the gift card, and control software for determining if the barcode and magnetic strip identifiers match, is the GA-Vehren 912, commercially available from GA-Vehren Engineering, St. Louis, Mo., 63146. Alternatively, such functions may be formed by the Nordstrom Eclipse Series EPC 30, running DataTrac software. Individual apparatus which perform only single functions, such as only the glue deposition or magnetic strip reading may also be utilized in a coordinated manner.

Envelope Inserting

The output hopper of the matching apparatus in system 124 into which gift card/greeting card combination or deposited also serves as the input hopper of the inserting system 122. The envelope inserting system input hopper serves as a buffer which enables the matching apparatus and inserting system 122 to be stopped and started independently. System 122 inserts the greeting card into the envelope as illustrated by process block 222 of FIG. 2. When marked on the greeting card, system 122 may optionally insert an addition blank 5×7 envelope for ship-to-self single card applications. In one embodiment, where the barcode data read during the matching process enables multiple carriers, that are part of the same order, to "accumulate" together along with an equivalent number of envelopes before being dropped into the insertion line. A machine suitable for use as system 122 in the envelope inserting process is the, commercially available from Grutzmacher Systems, Netherlands.

System 122 also includes a barcode reader that reads the barcode on the rear of the greeting card prior to the card's insertion into an envelope. The data read from the barcode on the greeting card is then used to do a real-time look up of the gift card profile in the database and allows retrieval of the information and format used to print the front of the envelope, including the sender information, the return information data, the recipient address data, and shipping type/shipping vendor information, all as illustrated by process block 224 of FIG. 2.

Envelope Printing

System 121 dynamically creates the front of the envelope and prints the sender/return address based on shipping specifications allowing mixed addressing requirement based on ship types. The barcode data read from the barcode on the greeting card by system 122 is used to do a real-time look up of the gift card profile in the database and allows retrieval of the information and format used to print the front of the envelope, including the sender information, the return information data, the recipient address data, and shipping type/shipping vendor information, also illustrated by process block 224 of FIG. 2.

In the contemplated system, a data matrix, which may be similar to the two-dimensional barcode described previously herein, may be printed on the front of the envelope, e.g., where the postage stamp is to be affixed. This data matrix and the data contained therein may be utilized for any number of verification functions as well as to provide data for sorting algorithms which allow the cards to be sorted according to shipment type/vendor, e.g., FedEx, UPS, DHL, US postal service, etc. In this matter, the sorting of the cards once inserted into their respective envelopes is also automated. The barcode on the front of the envelope also enables customization of postage/shipping labels, for example, such as with a private carrier's proprietary format to be applied directly to the front of the envelope, whenever appropriate. A machine suitable for use as system 121 in the envelope printing process is the Busko Ink Jet Base, Busko Apollo Array and Controller, commercially available from Busko, Inc.

In addition, it is also contemplated within the disclose system 120 that the front of each envelope may be inspected to ensure that a valid destination address is present thereon. One or more cameras operatively coupled to a processor executing an optical character recognition software package can be utilized to confirm that the address contains some type of recognizable characters. Such functionality may be used to identify missing, streaked or unintelligible characters resulting from printing irregularities errors such as lack of ink, misaligned contact between the printing head and the envelope surface, etc. Alternatively, the disclose system may be utilized with windowed envelopes in which the shipping address contained on a portion of the carrier mechanism for the gift card is viewable, once inserted into the envelope, from the envelope exterior. Also, alternatively, instead of applying addresses to the envelopes containing the greeting card, the contemplated system can also place the greeting cards in blank envelopes for self addressing by the customer.

Finally, postage stamps or other payment indicia, for example for private carriers, are applied to the envelopes, as illustrated by process block 226. Traditional first-class stamps may be applied to the front of the envelopes using any number of commercially available postage machines, such as the Hasler HT20, and card feeder model Hasler MPFDS, both commercially available from Hasler, Inc. Sheldon, Calif., will go as illustrated by process block 126 of FIG. 2. Systems 126 through 132 represent at a minimum, input hoppers into which envelopes may be sorted according to their respective shipment type using the techniques disclosed herein. Once the envelopes have been labeled and sorted an automatic trigger sends the shipment confirmation back up to the central message processing system. The shipping confirmations also include tracking numbers, if applicable.

On receipt of the shipping confirmation, the system can activate the cards using a number of different activation methodologies in conjunction with different retailers, banks, and corporate customer.

Figure 4:
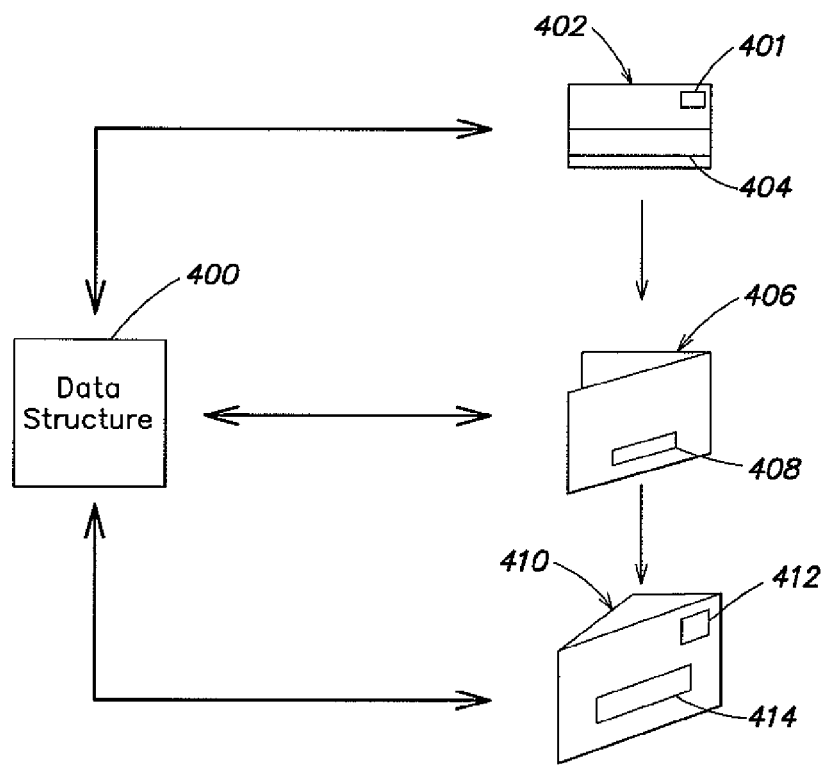

FIG. 4 illustrates conceptually the relationship between a gift card data structure 400, a gift card 402, a greeting card 406 and an envelope 410. The gift card data structure 400 may comprise any of the gift card profile information described herein, as well as other data relevant to the transaction or for manufacturing purposes. Gift card 402 was manufactured in accordance with the techniques described herein and comprises a two-dimensional barcode 401 and a magnetic strip 404. The arrows associating gift card 402 with data structure 400 represent the relationship between the information contained within the data structure and the data on the gift card itself. Specifically, the barcode 401 is manufactured from a data that was originally contained within the data structure 400. The barcode 401, once applied to the gift card, in turn, is read and utilized to access the information within data structure 400 to identify which magnetic strip format will be used for the magnetic strip 404 of the gift card.

Similarly, the arrows associating greeting card 406 with data structure 400 represent the relationship between the information contained within the data structure and the data on the greeting card itself. Specifically, the barcode 408 is manufactured from a data that was originally contained within the data structure 400. The barcode 408, once applied to the greeting card, in turn, is read and utilized to verify the proper correspondence with the gift card 402 and to access the information within data structure 400 to identify which the recipient address and shipping type of the greeting card/gift card combination.

The arrows associating greeting card 410 with data structure 400 represent the relationship between the information contained within the data structure and the data on the gift card itself. Specifically, the barcode 401 is manufactured from a data that was originally contained within the data structure 400. The barcode 412, once applied to the envelope 410, in turn, is read and utilized to access the information within data structure 400 to identify the recipient address 414 printed on the envelope and any special shipping type to define be postage and sorting of the combined entity. Smaller arrows are indicated in FIG. 4 to illustrate the relationship of the gift card with 402 as being attached to the greeting card 406 the combination of which is then inserted into envelope 410.

Figure 5:
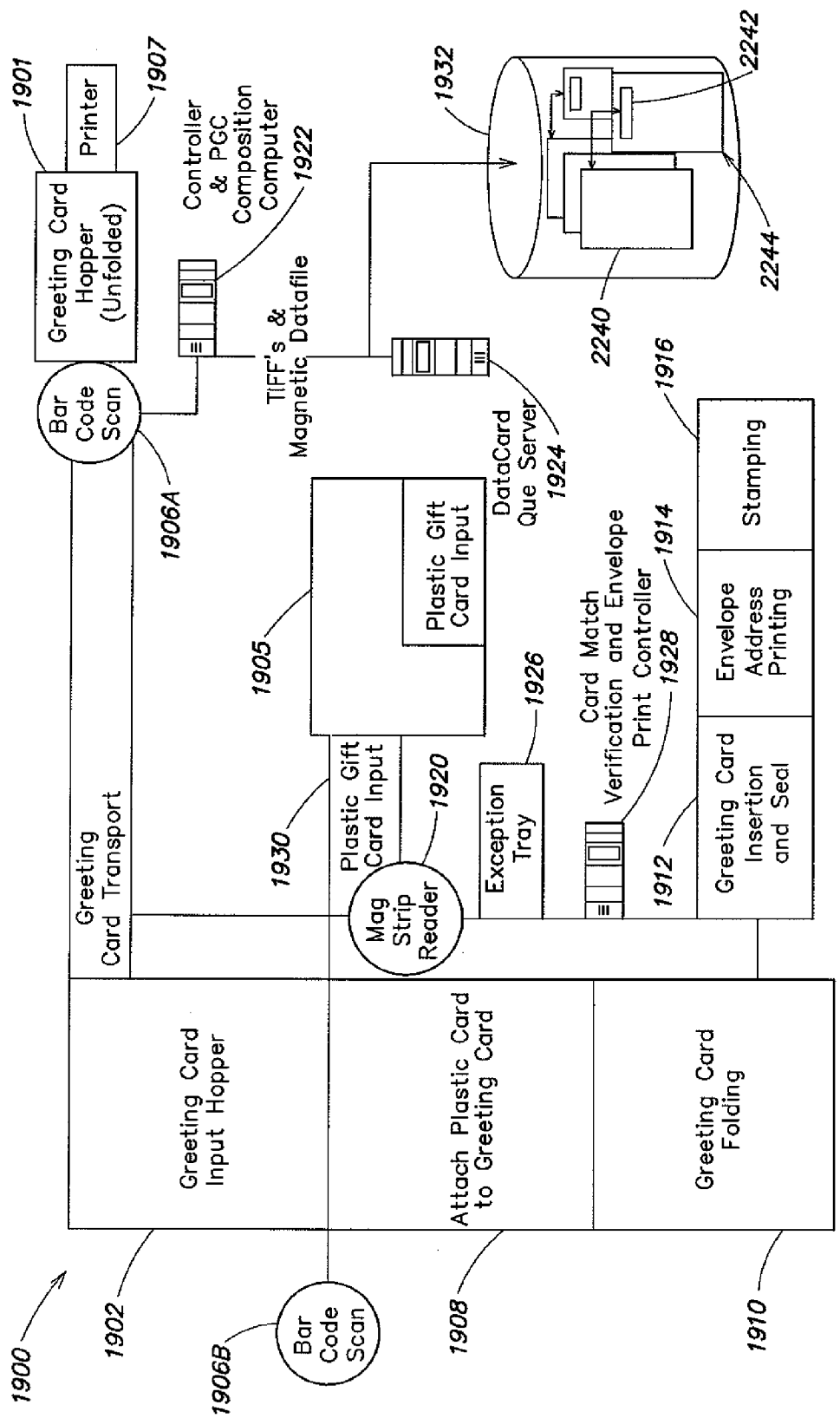
FIG. 5 is a conceptual block diagram of another manufacturing system and functional flow of the manufacturing system.

FIG. 5 illustrates conceptually an embodiment of a system 1900 suitable for use with the concepts disclosed herein. System 1900 comprises a pair of greeting card hoppers 1901-1902, a pair of barcode scanners 1906A-B, a magnetic strip reader 1920, computers 1922, 1924 and 1928, and database 1932 with its corresponding internal records 2240-2244, gift card printer 1905 and carrier media printer 1907, greeting card folder 1910, envelop inserter 1912, exception tray 1926, gift card attachment device 1908, envelope address printer 1914, and stamping machine 1916. The hardware necessary to implement the above-described components may utilize existing commercially available mechanisms, currently used in the publishing and printing industry, however, modifications may be required to accommodate the characteristics of the greeting card stock or the gift card carrier medium. Computers 1922, 1924 and 1928 may be implemented with any number of commercially available system, including, but not limited to, those described previously herein, or, alternatively, may be implemented with a single computer, or as park of the data processing capabilities associated with one or more of the printer's 1905 and 1907.

Computer 1922 is networked to computer 1924 and 1928 and controls the printing of a gift card, i.e., the printing of a gift card in conjunction with any user-defined customizations thereto and a gift card reference data. In addition, computer 1922 provides access to database 1932 which maintains the image files for the greeting cards and gift cards, as well as the gift card reference data. The personalized greeting cards and the associated gift cards may be defined in database 1932 utilizing any of the data fields and the data structures described previously herein. The gift card may be identified similar to any other gift associated with a specific vendor transaction including any of the data fields indicated in gift card profile.

One of the benefits of the disclosed custom printing technology, is that the CVV numbers, on the back of a payment card, are placed on the plastic card at the time of printing and are below the laminate thus making the card more secure. The current industry solution is to engrave the CVV on the exterior of the card, due to the fact that the CVV and number printing process is post manufacturing of the card. The ability to print under the laminate is more desirable security consideration, since without the embossing the print on the external of the card and the magnetic strip encoding becomes more risky.

The above described process enables the rapid manufacture of gift cards with 100% variability of substantially all gift card parameters, including front and back graphics and a magnetic strip format and data type, without negatively affecting the speed with which the gift cards may be manufactured. The advantages in speed, cost reduction and accuracy afforded by the above-described process provide a serious competitive advantage over current competitors in the same space.

The disclosed process of manufacturing plastic for customized financial payment instruments is a module by module manufacturing process that has been described with reference to gift cards. As such modular components and their respective functionality can be added or removed, as required. For example, for credit cards, an embossing process may be added for placement of the card data onto the substrate. As another example, for European or other markets an additional module may be inserted into the manufacturing process for adding smart chips, etc., in place of the magnetic strip or as a supplement thereto. A process for adding smart chips to financial transaction cards is disclosed in US Patent Application Publication, Pub. No. US2007/0246526 A1. In such implementation, a read/write mechanism, such as a Datacard 5000 card reader, reads the unique ID on the gift card and also grinds out the plastic on the card, and places an embedded chip onto the card surface. The data associated with the particular gift card file from memory is then written onto the chip. In such implementation, the data which would normally be encoded with the magnetic strip would instead be written to the chip depending. As another example, the readable/writable data storage mechanism implemented with a strip of magnetically readable material on a gift card may be replaced by or supplemented with a barcode or data matrix printable on the gift card substrate or a previously processed surface layer of the gift card. In such implementation, the data which would normally be encoded with the magnetic strip would instead be written or stored as part of the barcode or data matrix itself.

The reader can appreciate that, in light of the disclosure contained herein describing the systems and processes and the nature of data which is printable on a panel of a personalized document such as any of a personalized greeting card, catalog or other direct marketing material, that multiple variations of the above-described process may be utilized in which the personalized printed material serves as the link among the matching, bundling and shipment of multiple items to a transaction as a single entity.

The above-described invention may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette, CD-ROM, ROM, or fixed disk, or transmittable to a computer system in a carrier wave, via a modem or other interface device, such as communications adapter connected to the network over a medium. Medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

What is claimed is:

1. A method of manufacturing a sheet of multiple financial transaction cards, each financial transaction card having a data format identifier associated therewith, including a writable data format for data storable on the financial transaction card, the method comprising:
   A) manufacturing, as part of a sheet, a first card with a readable data storage mechanism on a surface of the first card and a readable/writable data storage mechanism on a surface of the first card, the readable data storage mechanism of the first card identifying a first writable data format for data storable on the readable/writable data storage mechanism of the first card;
   B) manufacturing, as part of the sheet, a second card with a readable data storage mechanism on a surface of the second card and a readable/writable data storage mechanism on a surface of the second card, the readable data storage mechanism of the second card identifying a second writable data format for data storable on the readable/writable data storage mechanism of the second card, manufacturing, as part of the sheet; and
   c) a third card with a readable data storage mechanism on a surface of the third card and a readable/writable data storage mechanism on a surface of the third card, the readable data storage mechanism of the third card identifying a third writable data format for data storable on the readable/writable data storage mechanism of third card,
   wherein the second writable data format is different from the first writable data format and wherein the third writable data format is different from either of the first and second writable data formats.

2. The method of claim 1, wherein the readable data storage mechanisms on any of the first, second, and third cards comprise bar codes.

* * * * *